(12) United States Patent
Miyao (10) Patent No.: US 11,526,045 B2
(45) Date of Patent: Dec. 13, 2022

(54) LIQUID CRYSTAL DISPLAY DEVICE

(71) Applicant: Japan Display Inc., Tokyo (JP)

(72) Inventor: Makoto Miyao, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/656,100

(22) Filed: Mar. 23, 2022

(65) Prior Publication Data

US 2022/0357615 A1 Nov. 10, 2022

(30) Foreign Application Priority Data

May 6, 2021 (JP) .............................. JP2021-078597

(51) Int. Cl.
| | | |
|---|---|---|
| *G02F 1/1333* | (2006.01) | |
| *G02F 1/1368* | (2006.01) | |
| *G02F 1/13357* | (2006.01) | |
| *G02F 1/1362* | (2006.01) | |
| *G02F 1/1343* | (2006.01) | |
| *G02F 1/1335* | (2006.01) | |
| *G02F 1/1334* | (2006.01) | |
| *G02F 1/133* | (2006.01) | |

(52) U.S. Cl.
CPC ...... *G02F 1/133382* (2013.01); *G02F 1/1334* (2013.01); *G02F 1/1368* (2013.01); *G02F 1/13306* (2013.01); *G02F 1/133331* (2021.01); *G02F 1/133526* (2013.01); *G02F 1/133615* (2013.01); *G02F 1/134309* (2013.01); *G02F 1/136286* (2013.01)

(58) Field of Classification Search
CPC ......... G02F 1/133382; G02F 1/133331; G02F 1/1334; G02F 1/133526; G02F 1/134309; G02F 1/136286; G02F 1/1368
See application file for complete search history.

(56) References Cited

U.S. PATENT DOCUMENTS

| | | | | |
|---|---|---|---|---|
| 2009/0180282 A1* | 7/2009 | Aylward | ........... | G02F 1/133605 362/245 |
| 2020/0326466 A1 | 10/2020 | Miyao | | |
| 2022/0197079 A1* | 6/2022 | Li | ........................ | H04N 5/2257 |

FOREIGN PATENT DOCUMENTS

| | | |
|---|---|---|
| JP | 2020-60682 A | 4/2020 |
| JP | 2020-160254 A | 10/2020 |

(Continued)

OTHER PUBLICATIONS

JP 2020060682 A Translation (Year: 2020).*

*Primary Examiner* — James A Dudek
(74) *Attorney, Agent, or Firm* — Maier & Maier, PLLC (57) ABSTRACT

The purpose is to suppress a temperature rise in the LED and the driver IC for a reliable transparent liquid crystal display device. An example of concrete structure to attain the purpose is: A display area is formed in an area where the TFT substrate and the counter substrate overlap, a terminal area is formed in an area where the TFT substrate and the counter substrate do not overlap, an LED is disposed in the terminal area opposing to a side surface of the counter substrate, the LED is connected to a printed wiring substrate, a driver IC to drive the liquid crystal display device is disposed in the terminal area, a metal plate is disposed between the driver IC and the printed wiring substrate, the metal plate contacts the printed wiring substrate via a first heat dissipation sheet, and contacts the driver IC via a second heat dissipation sheet.

15 Claims, 11 Drawing Sheets

(56) References Cited

FOREIGN PATENT DOCUMENTS

| JP | 2020-177050 A | 10/2020 |
| JP | 2021-33043 A | 3/2021 |

* cited by examiner

LIQUID CRYSTAL DISPLAY DEVICE

CLAIM OF PRIORITY

The present application claims priority from Japanese Patent Application JP 2021-078597 filed on May 6, 2021, the content of which is hereby incorporated by reference into this application.

BACKGROUND OF THE INVENTION

(1) Field of the Invention

The present invention relates to display devices especially to transparent liquid crystal display devices.

(2) Description of the Related Art

There is a need of the display device that a back side of the display device is visible as the glass. In a transparent display device, back ground of the display device can be visible through the area in which image is not displayed, while, image can be superposed to the back ground in the area in which image is displayed. Such a transparent display device can be realized by a liquid crystal display device.

Patent documents 1 through 4 disclose configurations to realize a transparent display device using so called a polymer dispersed liquid crystal display device.

PRIOR TECHNICAL DOCUMENT

Patent document 1: Japanese patent application laid open 2020-177050.
Patent document 2: Japanese patent application laid open 2020-160254.
Patent document 3: Japanese patent application laid open 2021-33043.
Patent document 4: Japanese patent application laid open 2020-60682.

SUMMARY OF THE INVENTION

A transparent liquid crystal display device cannot use a direct back light, consequently, side light type back light, in which a light source is disposed at a side of the substrate, is used. An LED (Light Emitting Diode) is used as an actual light source; An LED emits light as well as generates heat. In the side light type, many LEDs are disposed in a limited space, as a side of the substrate, therefore, a rise in temperature in the light source becomes a problem.

In the meantime, a color filter is not used in the transparent liquid crystal display device to raise a light utilizing efficiency. A color filter decreases a light utilizing efficiency to one third (⅓). In addition, a color filter becomes a hindrance to a transparency of light. Field sequential driving method does not use a color filter, however, a temperature rise in a driver IC becomes a problem because driving frequency in field sequential method is high.

The purpose of the present invention is to suppress a temperature rise in the LED, the driver IC, and so forth, thus to suppress a decrease in light utilizing efficiency of LEDs, malfunction of the driver IC, deterioration of peripheral parts, and so forth in a transparent liquid crystal display device using a side light type back light.

The present invention overcomes the above explained problems; the concrete structures are as follows.

(1) A liquid crystal display device including: a TFT substrate including a pixel electrode, and liquid crystal sandwiched between the TFT substrate and a counter substrate; in which a display area is formed in an area where the TFT substrate and the counter substrate overlap, a terminal area is formed in an area where the TFT substrate and the counter substrate do not overlap, an LED is disposed in the terminal area opposing to a side surface of the counter substrate, the LED is connected to a printed wiring substrate, a driver IC to drive the liquid crystal display device is disposed in the terminal area, a metal plate is disposed between the driver IC and the printed wiring substrate, and the metal plate contacts the printed wiring substrate via a first heat dissipation sheet, and contacts the driver IC via a second heat dissipation sheet.

(2) A liquid crystal display device including: a TFT substrate including a pixel electrode, and liquid crystal sandwiched between the TFT substrate and a counter substrate; in which a display area is formed in an area where the TFT substrate and the counter substrate overlap, a terminal area is formed in an area where the TFT substrate and the counter substrate do not overlap, an LED is disposed in the terminal area opposing to a side surface of the counter substrate, the LED is connected to a printed wiring substrate, a driver IC to drive the liquid crystal display device is disposed in the terminal area, a first heat dissipation sheet is disposed on the printed wiring substrate at an opposite side to which the LED is connected, and a metal plate is disposed between the driver IC and the printed wiring substrate, the metal plate contacts the driver IC via a second heat dissipation sheet.

(3) A liquid crystal display device including: a TFT substrate including a pixel electrode, and liquid crystal sandwiched between the TFT substrate and a counter substrate; in which a display area is formed in an area where the TFT substrate and the counter substrate overlap, a terminal area is formed in an area where the TFT substrate and the counter substrate do not overlap, an LED is disposed in the terminal area opposing to a side surface of the counter substrate, the LED is connected to a printed wiring substrate, a driver IC to drive the liquid crystal display device is disposed in the terminal area, a first metal plate is disposed between the driver IC and the printed wiring substrate, the first metal plate contacts the printed wiring substrate through a first heat dissipation sheet, and a second metal plate is disposed via a second heat dissipation sheet under the TFT substrate 100 at an opposite side to which the driver IC is connected.

(4) A liquid crystal display device including: a TFT substrate including a pixel electrode, and liquid crystal sandwiched between the TFT substrate and a counter substrate: in which a display area is formed in an area where the TFT substrate and the counter substrate overlap, a terminal area is formed in an area where the TFT substrate and the counter substrate do not overlap, an LED is disposed in the terminal area opposing to a side surface of the counter substrate, the LED is connected to a printed wiring substrate, a driver IC to drive the liquid crystal display device is disposed in the terminal area, the terminal area, the driver IC, the LED and the printed wiring substrate are contained in the casing made of metal, the casing and the printed wiring substrate contact each other via a first heat dissipation sheet, and a surface of the TFT substrate opposite to a surface on which the driver IC is disposed contacts the casing via a second heat dissipation sheet.

DETAILED DESCRIPTION OF THE PREFERRED EMBODIMENTS

Figure 1:
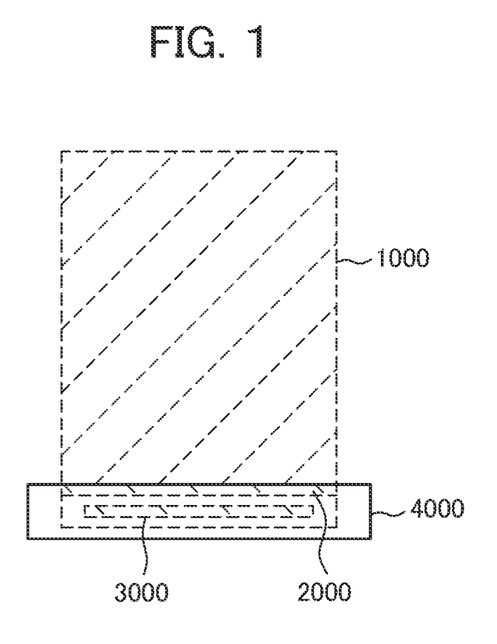
FIG. 1 is a front view of a transparent liquid crystal display device.
Figure 2:
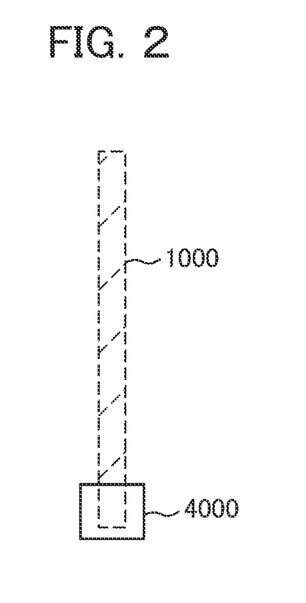
FIG. 2 is side view of the transparent liquid crystal display device.

FIG. 1 is a front view of a transparent liquid crystal display device and FIG. 2 is a side view of it. In FIGS. 1 and 2, a back light is not disposed at the rear side of the display area, and the substrate is made of transparent glass, consequently, light can pass the transparent liquid crystal display device, thus, a back ground of the display device can be visible in normal.

The light source 2000 as a side light and a driving circuit region 3000 are disposed in the casing 4000. Images displayed in the display area are visible from both front side and back side of the display. The images displayed in the transparent liquid crystal display device give an illusion that images are projected in a back ground.

Figure 3:
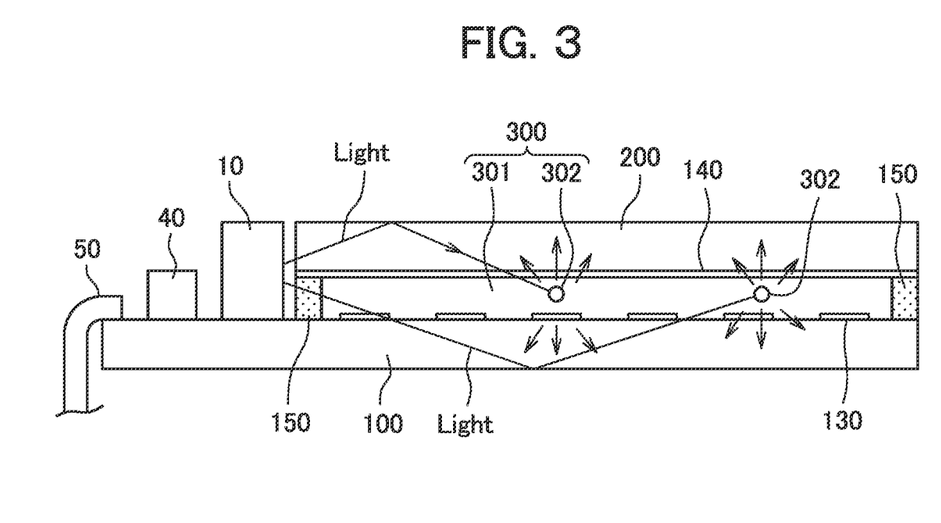
FIG. 3 is a cross sectional view to show a function of the transparent liquid crystal display device.

FIG. 3 is a cross sectional view of the transparent liquid crystal display device to show a function of it. Since FIG. 3 is a simplified configuration, it is slightly different from the cross sectional views explained in embodiments which are explained later. In FIG. 3, the liquid crystal is sandwiched between the TFT substrate 100 on which the pixel electrodes 130, the wirings, TFTs and so forth are formed, and the counter substrate 200, on which a common electrode 140 is formed. In FIG. 3, a color filter is not formed since the transparent liquid crystal of FIG. 3 is driven by field sequential method. A display area is formed at the area the TFT substrate 100 and the counter substrate 200 overlap; the terminal area is formed at the area the TFT substrate 100 and the counter substrate 200 do not overlap.

Figure 4:
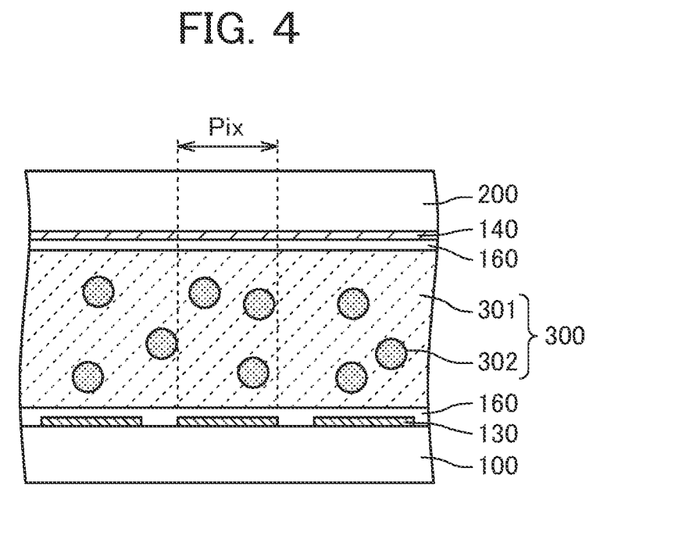
FIG. 4 is a cross sectional view to show a details of the liquid crystal layer.

In FIG. 3, the TFT substrate 100 and the counter substrate 200 are adhered to each other by seal material 150, the liquid crystal layer 300 is sandwiched therein. The seal material 150 is transparent resin. The liquid crystal 300 in FIG. 3 is so called polymer dispersed liquid crystal, the configuration of it is depicted in FIG. 4. The liquid crystal 300 is sandwiched between the TFT substrate 100, on which the pixel electrodes 130 and the alignment film 160 thereon are formed, and the counter substrate 200, on which the common electrode 140 and the alignment film 160 thereon are formed. In FIG. 4, the pixel Pix is formed corresponding to the pixel electrode 130.

The liquid crystal 300 is so called polymer dispersed liquid crystal, which is configured from the bulk 301, which is formed from polymer, and fine particles 302, which includes liquid crystal molecules. When a voltage is applied between the pixel electrode 130 and the common electrode 140, the fine particles 302, which include liquid crystal molecules, rotate and control the scattering of light. When a voltage is not applied between the pixel electrode 130 and the common electrode 140, light is not dispersed. Since scattering of light is controlled in each of the pixels, images are formed. Those images are visible from front side and back side of the liquid crystal display panel.

Back to FIG. 3, the TFT substrate 100 is formed larger than the counter substrate 200; the area of the TFT substrate 100 which does not overlap the counter substrate 200 forms a terminal area. The LED 10 as the light source is disposed on the terminal area opposing to the side surface of the counter substrate 200. The light from the LED 10 enters the inside of the liquid crystal panel through the side surface of the counter substrate 200 or the seal material 150. The light incident repeats total reflections and collides with the fine particle 302, which includes liquid crystal molecules.

When the light collides with the fine particles in the pixel in which a voltage is applied between the pixel electrode 130 and the common electrode 140, the light is scattered as depicted in FIG. 3. On the other hand, the light goes straight in the pixel in which a voltage is not applied between the pixel electrode 130 and the common electrode 140. Since the light incident in the liquid crystal 300 is controlled in each of the pixels, images are formed.

In FIG. 3, the driver IC 40 is disposed alongside the LED 10, which is a light source. The driver IC 40 is to drive the liquid crystal display panel; the driver IC 40 becomes high temperature during operation. Specifically, the liquid crystal display device of FIG. 3 is driven by field sequential method, in which data is processed in three times higher speed than conventional driving method, therefore, a heat generation in the driver IC 40 becomes large.

The main printed wiring substrate 50 is connected to the edge of the TFT substrate 100 to supply signals and power to the driver IC 40. The main printed wiring substrate 50 is e.g. a FPC (Flexible Printed Circuit). In actual device, a printed wiring substrate for LED exists to supply power to the LED 10 as a light source, but it is omitted in FIG. 3.

Figure 5:
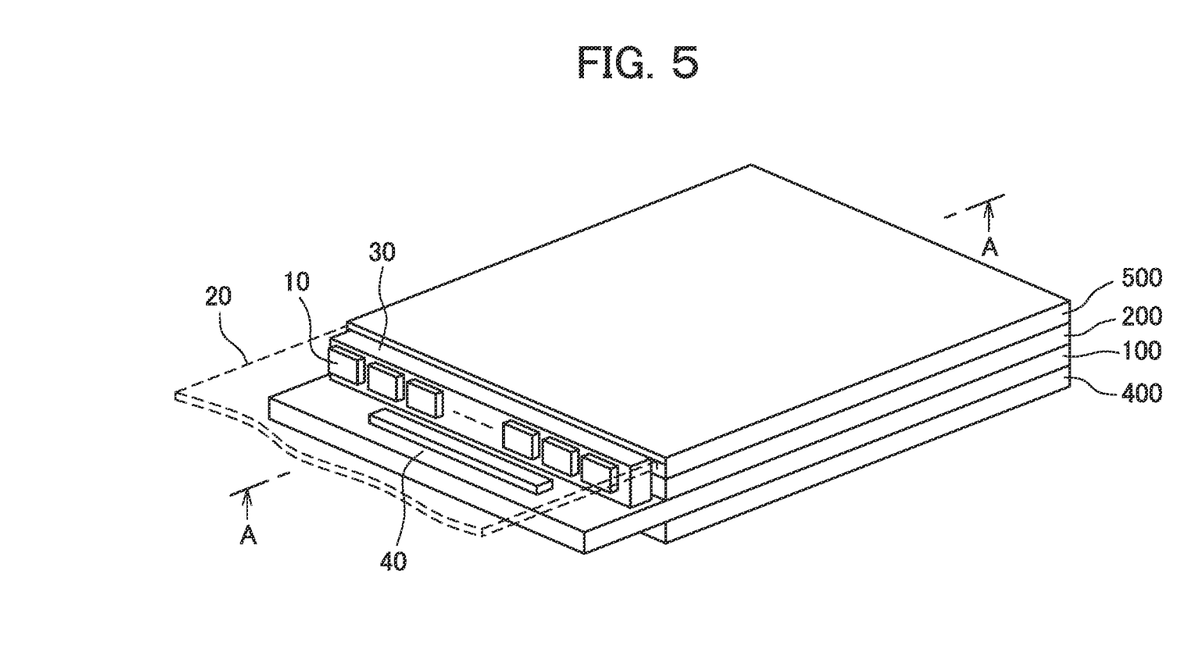
FIG. 5 is a perspective view of the transparent liquid crystal display device as a comparative example.

FIG. 5 is a perspective view of a comparative example of a liquid crystal display device to which the present invention is to be applied. In FIG. 5, the TFT substrate 100 and the counter substrate 200 are superposed each other. The liquid crystal is sandwiched between the TFT substrate 100 and the counter substrate 200 as depicted in FIG. 3. The first cover glass 500 for mechanical protection is adhered to the counter substrate 200; the second cover glass 400 for mechanical protection is adhered to the TFT substrate 100. A thickness of each of the TFT substrate 100, the counter substrate 200, the first cover glass 500, and the second cover glass is e.g. 0.7 mm.

The TFT substrate 100 is made larger than the counter substrate 200, the area of the TFT substrate 100 which does not overlap the counter substrate 200 is a terminal area. The lens 30 is disposed on the terminal area opposing to the side surfaces of the counter substrate 200 and the first cover glass 500, and the LED 10 is disposed opposing to the lens 30. Three LED chips, which emit light of red, green and blue, are disposed in each package of the LEDs 10. The liquid crystal display device of FIG. 5 is driven by field sequential method, in which red picture, green picture and blue picture are displayed in time division to form a color image.

The lens 30 has a role to guide the light from the LED 10 efficiently to the first cover glass 500 and the counter substrate 200. The light from the LED 10 repeats total reflection at the TFT substrate 100, the counter substrate 200, the first cover glass 500 and the second cover glass 400, and eventually enters the liquid crystal layer 300. The lens 30 converges or diverges the light from the LED 10 to guide the light uniformly into the liquid crystal layer 300. In some cases, a light guide plate is used instead of the lens 30. A light guide plate has a role to guide the light from the LED to the counter substrate 200 or the first cover glass 500 uniformly and efficiently. In actual devices, in many cases, the lens 30 and the light guide plate has a similar role. In this specification, the name of lens 30 is used, however, this name can be substituted as a light guide plate.

The upper surface of the LED 10 is connected to the printed wiring substrate 20. The printed wiring substrate 20 is e.g. a PCB (Printed Circuit Board). In other words, the LED 10 is hanged down from the printed wiring substrate 20. The LED 10 receives power, and signals of ON and OFF from the printed wiring substrate 20.

In FIG. 5, the driver IC 40 is set alongside the LED 10 in the terminal area. The liquid crystal display device of the present invention is driven by field sequential method, in which data is processed in three times higher speed than conventional driving method, therefore, a heat generation in the driver IC 40 is large. The main printed wiring substrate 50, which supplies power and video signals to the driver IC 40, is omitted in FIG. 5.

Figure 6:
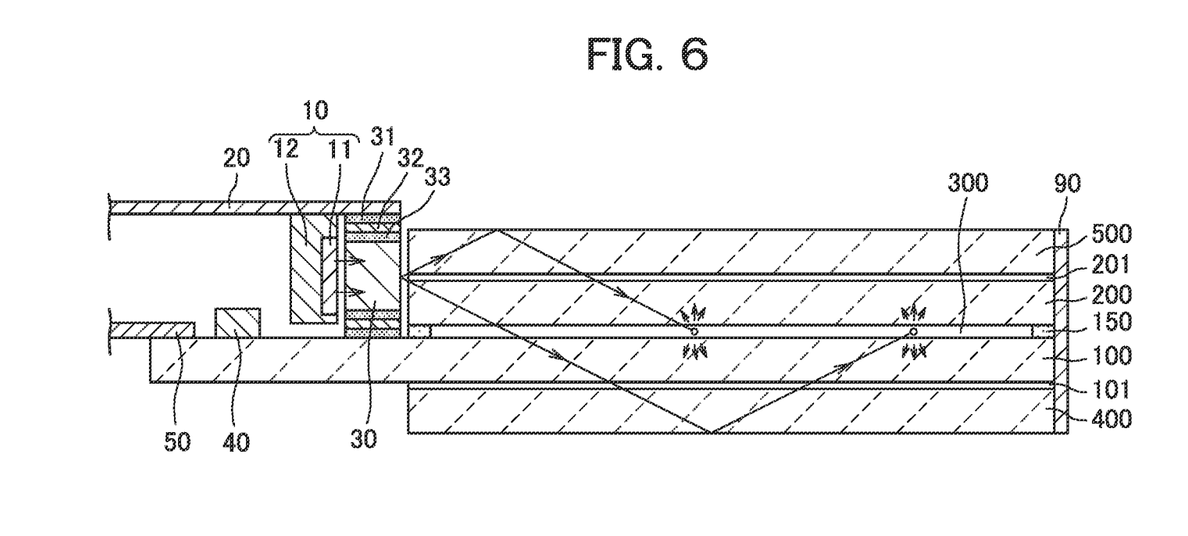
FIG. 6 is a cross sectional view of the transparent liquid crystal display device as a comparative example.

FIG. 6 is a cross sectional view of the transparent liquid crystal display device. Although FIG. 6 corresponds to a cross sectional view along the line A-A of FIG. 5, some components of FIG. 6 are not necessarily correspond to the components of FIG. 5. In FIG. 6, the TFT substrate 100 and the counter substrate 200 are adhered to each other by transparent seal material 150; the polymer dispersed liquid crystal 300, explained in FIG. 4, is sandwiched between the TFT substrate 100 and the counter substrate 200. The second cover glass 400 is adhered to the TFT substrate 100 through the OCA (Optical Clear Adhesive) 101. The OCA 101 is a transparent adhesive formed into a tape made of resin of acrylic, silicone and so forth.

The first cover glass 500 is adhered to the counter substrate 200 through the OCA 201. A thickness of each of the TFT substrate 100, the counter substrate 200, the first cover glass 500, and the second cover glass is e.g. 0.7 mm. Since those substrates are all transparent, the back ground of the display device is seen through.

In FIG. 6, the LED 10 and the lens 30 are disposed opposing to the side surfaces of the counter substrate 200 and the first cover glass 500. The light from the LED 10 initially enters the lens 30; the lens 30 bends the direction of light to such an angle that the light performs a total reflection at the counter substrate 200, the TFT substrate 100, the first cover glass 500 and the second cover glass 400. The light passes are shown by arrows in FIG. 6. The LED 10 is shown separately as the emitting part 11 and the package 12. The LED 10 is connected to the printed wiring substrate 20 by conductive material as an anisotropic conductive film. The LED 10 is hanged down from the printed wiring substrate 20.

The light, entered from the lens 30 into the first cover glass 500 and the counter substrate 200, performs total reflections at the first cover glass 500, the counter substrate 200, the TFT substrate 100 and the second cover glass 400, and eventually enters the liquid crystal layer 300. In the liquid crystal layer 300, the liquid crystal molecules rotate in the pixel in which a signal is applied to the pixel electrode 130; the light is scattered in this pixel. On the other hand, the light goes straight in the pixel in which a signal is not applied. Since the light incident in the liquid crystal 300 is controlled in each of the pixels, images are formed.

In FIG. 6, the reflection sheet 90 is disposed at the side surfaces of the first cover glass 500, the counter substrate 200, the TFT substrate 100 and the second cover glass 400, at opposite side from which LED 10 is disposed. The light reflected at the reflection sheet 90 enters the liquid crystal layer 300 again and is used to form images.

In FIG. 6, the lens 30 is disposed between the TFT substrate 100 and the printed wiring substrate 20, and is adhered to the TFT substrate 100. Three layers of a double sided adhesive tape 33, a reflection sheet 32 and an OCA 31 are set from the side of the lens 30, between the lens 30 and the TFT substrate 100, and between the lens 30 and the printed wiring substrate 20. The reflection sheet 32 reflects the scattered light from the lens 30 to raise a utilization efficiency of the light. The double sided adhesive tape 33 and the OCA 31 are for fixing the lens 30. The double sided adhesive tape 33 can be substituted by another OCA.

The driver IC 40 for driving the liquid crystal display panel is disposed in the vicinity of the LED 10. The driver IC 40 connects to the wirings on the TFT substrate 100. Since the liquid crystal display panel is driven by field sequential method, in which data is processed in three times higher speed than conventional driving method, a heat generation in the driver IC 40 becomes large. The main printed wiring substrate 50 is connected to the edge of the TFT substrate 100 to supply signals and power to the liquid crystal display panel.

In FIG. 6, the LED 10 and the driver IC 40, both of them become high temperature, are disposed in adjacent to each other; consequently, the neighborhood also becomes high temperature. As a result, malfunction of the driver IC 40, or misalignment between parts due to thermal expansion occurs; therefore, reliability of the liquid crystal display device decreases. In addition, a light emitting efficiency of the LED 10 decreases when the temperature of the LED 10 increases.

The purpose of the present invention is to solve the above explained problems by suppressing the temperature rise in the LED 10 and the driving IC 40, thus, to realize a transparent liquid crystal display device of high reliability and high light utilizing efficiency.

Embodiment 1

Figure 7:
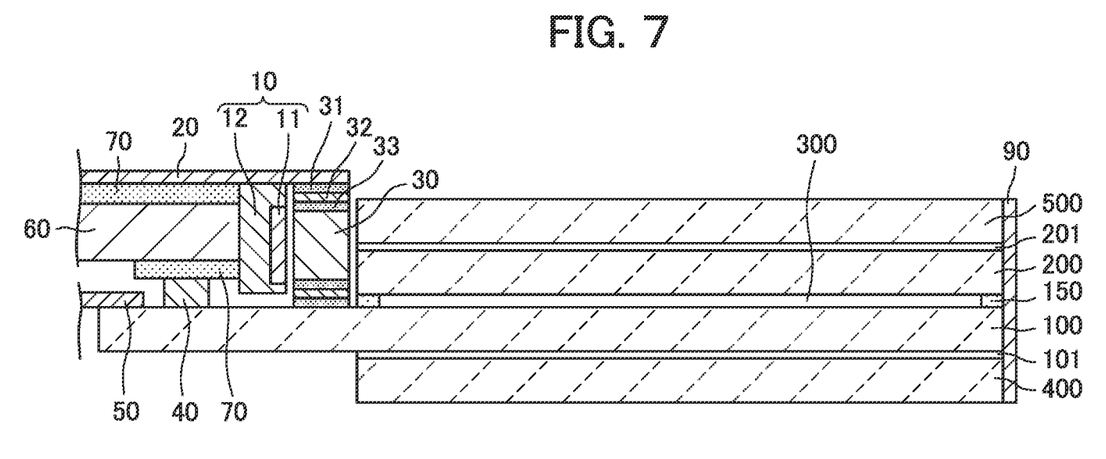
FIG. 7 is a cross sectional view of the transparent liquid crystal display device according to embodiment 1.

FIG. 7 is a cross sectional view of embodiment 1. The structure of FIG. 7 is the same as the structure of FIG. 6, which is explained as a comparative example, except the heat dissipation structure in the terminal area. In FIG. 7, a metal plate 60 is disposed in contact with the LED 10. The metal plate 60 is an Al plate, but a Cu plate also can be used. The metal plate 60 is sandwiched by heat dissipation sheets 70. The heat dissipation sheet 70 is a resin sheet of high heat conduction. Since the heat dissipation sheet 70 is made of soft resin, it contacts flexibly other parts, thus, the heat dissipation sheet 70 has a high heat dissipation ability.

In FIG. 7, the heat dissipation sheet 70 of lower side is sandwiched between the metal plate 60 and the driver IC 40. Since the heat dissipation sheet 70 is soft, it can flexibly contact both the driver IC 40 and the metal plate 60. The heat dissipation sheet 70 of upper side is sandwiched between the metal plate 60 and the printed wiring substrate 20. The heat dissipation sheet 70 of upper side absorbs the heat conducted from the LED 10 to the printed wiring substrate 20, and suppresses a temperature rise in the LED 10. In FIG. 7, if the heat dissipation sheet 70 is disposed between the metal plate 60 and the LED 10, the heat from the LED 10 can be absorbed more efficiently by the metal plate 60. This example is depicted in FIG. 9.

Figure 8:
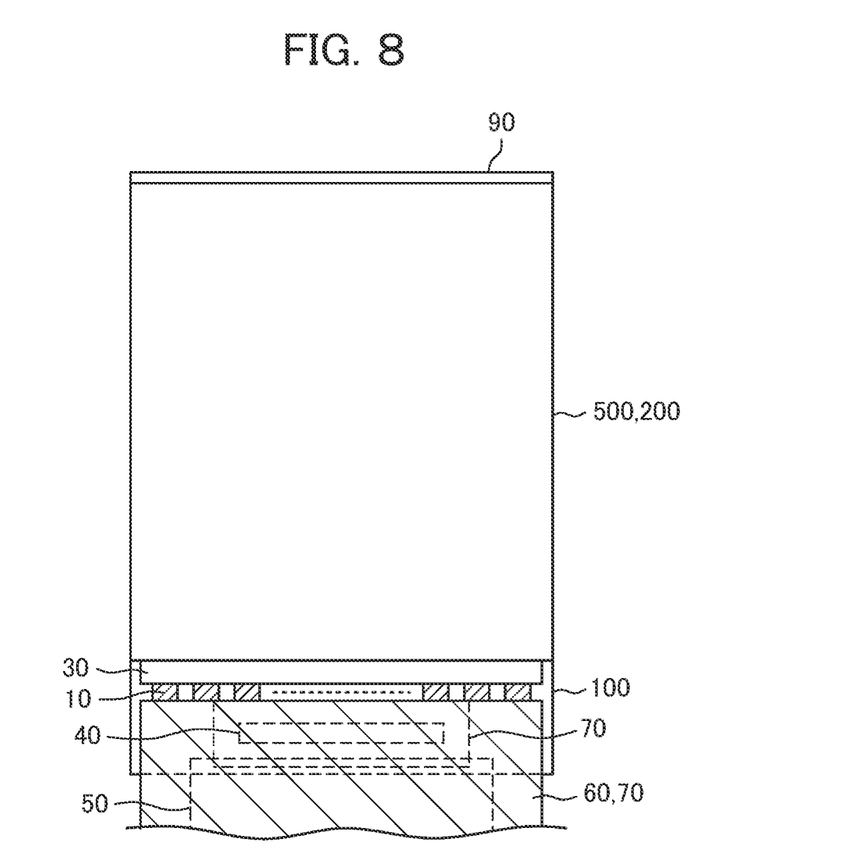
FIG. 8 is a plan view of FIG. 7.

FIG. 8 is a plan view of FIG. 7. In FIG. 8, however, the printed wiring substrate 20, OCA 31, the reflection sheet 32, and so forth are omitted. In FIG. 8, many LEDs 10 are disposed opposing to the lens 30. The metal plate 60 for heat dissipation and the heat dissipation sheet 70 covering the metal plate 60 are disposed in contact with the many LEDs 10. The metal plate 60 covers approximately all the terminal area. By the way, as depicted in FIG. 9, the heat dissipation sheet 70 can be disposed between the LED 10 and the metal plate 60 to raise a heat contact between the LED 10 and the metal plate 60.

In FIG. 8, the lower side heat dissipation sheet 70 is disposed between the metal sheet 60 and the driver IC 40, which is installed on the terminal area of the TFT substrate 100. The area of the lower side heat dissipation sheet 70 is smaller than the area of the upper side heat dissipation sheet 70 in a plan view because the lower side heat dissipation sheet 70 needs to cover only the driver IC 40. The heat both from the LED 10 and the driver IC 40 is dissipated to the metal plate 60.

Figure 9:
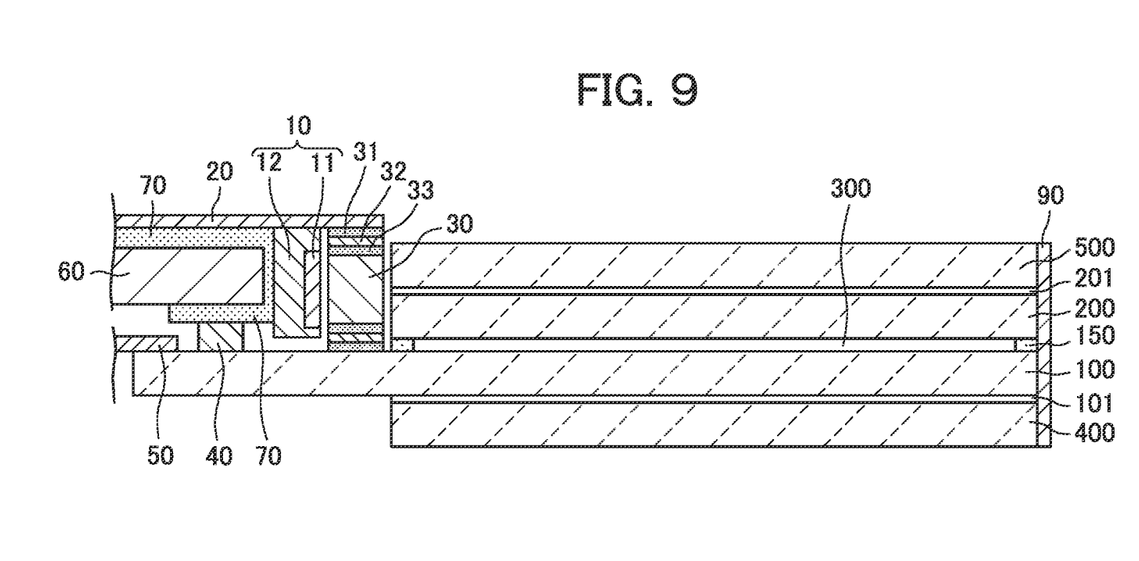
FIG. 9 is a cross sectional view of the transparent liquid crystal display device of another example according to embodiment 1.

FIG. 9 is an example of a structure in which the heat dissipation sheet 70 is disposed between the metal plate 60 and the LED 10. The heat dissipation sheet 70 deforms flexibly to contact side surfaces of the metal plate 60 and the LED 10; thus, the heat conductance from the LED 10 to the metal plate 60 is improved. Although the metal sheet 60 is surrounded by a single heat dissipation sheet 70 in FIG. 9, the heat dissipation sheet 70 can be divided.

Since mere existence of the metal plate 60 increases a heat capacitance, a temperature of the LED 10 or the driver IC 40 is decreased. In addition, since the metal plate 60 has a high heat conductance, if the metal plate 60 contacts a metal casing via the heat dissipation sheet 70, the heat can be more effectively dissipated.

Embodiment 2

Figure 10:
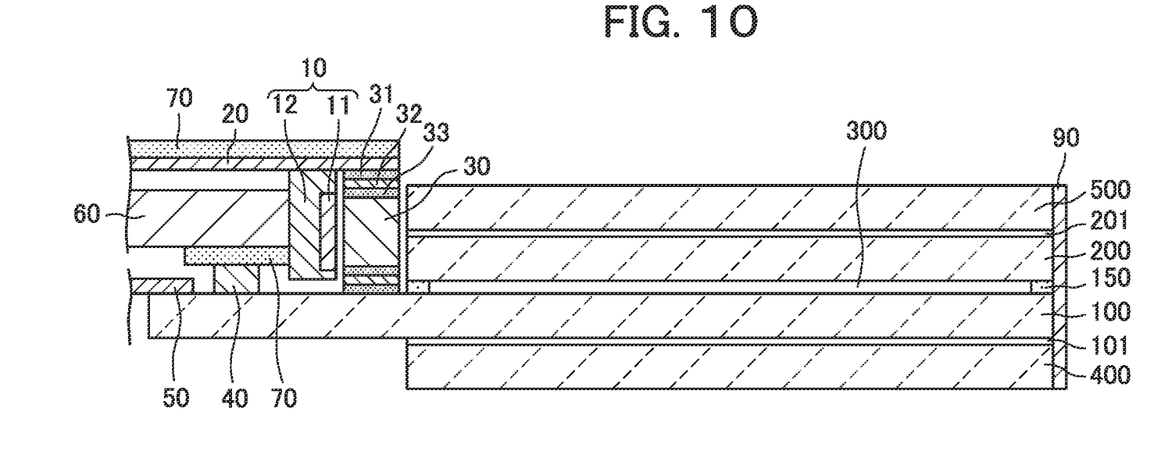
FIG. 10 is a cross sectional view of the transparent liquid crystal display device according to embodiment 2.

FIG. 10 is a cross sectional view of embodiment 2. The structure of FIG. 10 is the same as the structure of FIG. 6, which is explained as a comparative example, except the heat dissipation structure in the terminal area. The heat dissipation structure of FIG. 10 is different from the structure of FIG. 7. Embodiment 2 specifically differs from embodiment 1 in that the heat is dissipated not only from the metal plate 60 but also from the upper side of the printed wiring substrate 20.

In FIG. 10, the heat dissipation sheet 70 is adhered to the printed wiring substrate 20. This heat dissipation sheet 70 contacts e.g. a metal casing and heat is dissipated to the metal casing. On the other hand, the heat generated in the driver IC 40 conducts to the metal plate 60 through the heat dissipation sheet 70 to suppress the temperature rise in the driver IC 40. By the way, the heat dissipation sheet 70 can be disposed between the LED 10 and the metal plate 60. In this structure, the heat of the LED 10 can be dissipated efficiently to the metal plate 60.

This embodiment is specifically effective when there is not enough space between the driver IC 40 and the printed wiring substrate 20. In FIG. 7, if there is not enough space between the TFT substrate 100 and the printed wiring substrate 20, there is a chance that the metal plate 60 of enough thickness cannot be used. A total thickness of the counter substrate 200, the first cover glass 500 and the OCA for the adhering them to each other is e.g. 1.5 mm; the driver IC 40, the metal plate 60, two heat dissipation sheets 70 are disposed in this space in the structure of embodiment 1. If the space is not enough, there is a necessity that a thickness of the metal plate 60 is made thin. Then, an enough heat dissipation cannot be expected.

In embodiment 2, only one heat dissipation sheet 70 is disposed between the TFT substrate 100 and the printed wiring substrate 20 to secure an enough thickness for the metal plate 60. The heat in the printed wiring substrate 20 is dissipated through the heat dissipation sheet 70 disposed on the printed wiring substrate 20. Thus, heat dissipation efficiency can be increased.

By the way, if a space for the heat dissipation sheet 70 is secured between the metal plate 60 and the printed wiring substrate 20, heat dissipation efficiency can be further improved. In this case, the heat dissipation effect for the printed wring substrate 20 in FIG. 10 is added to the effect of embodiment 1.

Embodiment 3

Figure 11:
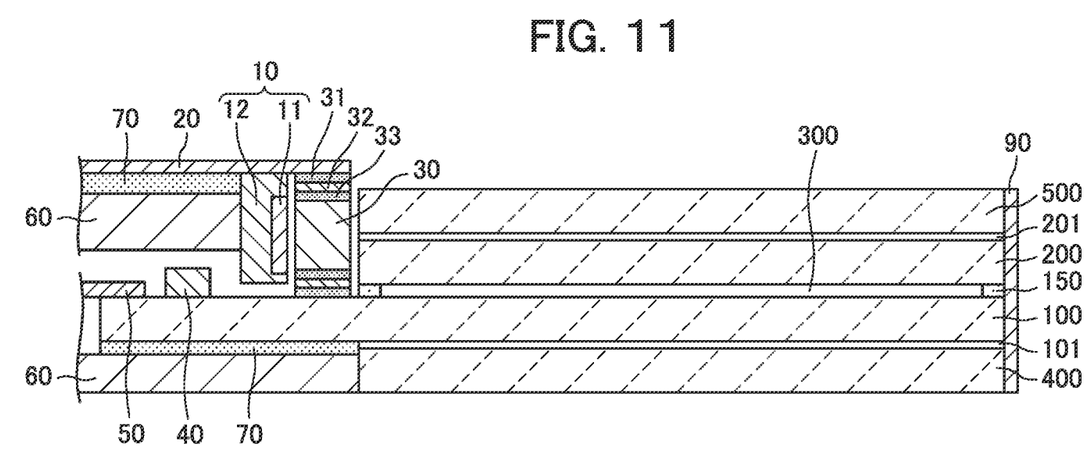
FIG. 11 is a cross sectional view of the transparent liquid crystal display device according to embodiment 3.

FIG. 11 is a cross sectional view of embodiment 3. The structure of FIG. 11 is the same as the structure of FIG. 6, which is explained as a comparative example, except the heat dissipation structure in the terminal area. The heat dissipation structure of FIG. 11 is different from the structure of FIG. 7 of embodiment 1 and the structure of FIG. 10 of embodiment 2. The structure of FIG. 11 is characterized in that two metal plates 60 are used to dissipate the heat generated in the LED 10 and the driver IC 40.

In FIG. 11, the metal plate 60 is disposed under the terminal area of the TFT substrate 100 through the heat dissipation sheet 70. The metal plate 60 under the terminal area mainly dissipates the heat generated in the IC driver 40. The heat dissipation sheet 70 is disposed between the terminal area of the TFT substrate 100 and the metal plate 60. The heat dissipation sheet 70 is to improve a heat conductance between the glass substrate 100 and the metal plate 60.

In FIG. 11, the metal plate 60 is adhered to the printed wiring substrate 20 through the heat dissipation sheet 70. The heat generated in the LED 10 conducts to the printed wiring substrate 20; the heat is dissipated to the metal plate 60 through the heat dissipation sheet 70. In FIG. 11, a side surface of the metal plate 60 contacts a side surface of the LED 10; if the heat dissipation sheet 70 is disposed between the metal plate 60 and the LED 10, heat dissipation effect is further improved.

In FIG. 11, as explained in embodiment 2, if the heat dissipation sheet 70 is adhered to the printed wiring substrate 20, and the heat dissipation sheet 70 is made contact to the metal casing, the heat dissipation effect is further improved. If a space can be secured between the metal plate 60 ad the driver IC 40 for the heat dissipation sheet 70, heat dissipation is further improved by disposing another heat dissipation sheet 70 in this space.

Embodiment 4

Figure 12:
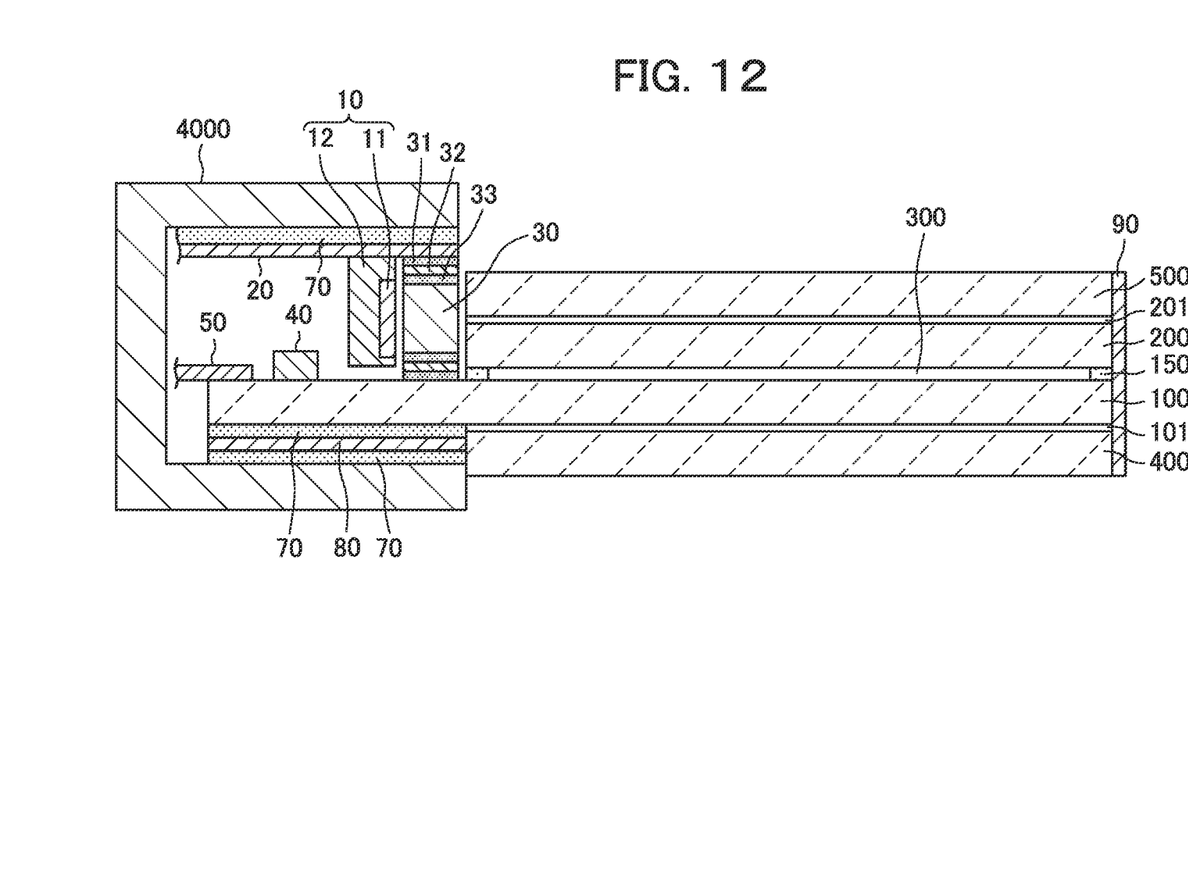
FIG. 12 is a cross sectional view of the transparent liquid crystal display device according to embodiment 4.

FIG. 12 is a cross sectional view of embodiment 4. The structure of FIG. 12 is the same as the structure of FIG. 6, which is explained as a comparative example, except the heat dissipation structure in the terminal area. In embodiment 4, the casing 4000 is used as a means of heat dissipation. In FIG. 12, the casing 4000 is made of metal. The metal is e.g. Al or Cu, and so forth. The heat dissipation sheet 70 is adhered to the printed wiring substrate 20; the heat dissipation sheet 70 contacts the casing 4000. Since the heat dissipation sheet 70 is soft, it adheres to the casing 4000 flexibly.

Two heat dissipation sheets 70, sandwiching the module driving substrate 80, are adhered to the rear portion of the terminal area of the TFT substrate 100. The module driving substrate 80 should be thin enough so that heat conduction is not hindered. Although it is not depicted, the module driving substrate 80 is another printed wiring substrate, which is connected to the main printed wiring substrate 50 or the printed wiring substrate 20; one example of the module driving substrate 80 is PCB. FIG. 12 is only an example; as an alternative example, only one heat dissipation sheet 70 is used between the back side of the terminal area and the casing 4000. Further, yet another alternative example is that a metal film is sandwiched by heat dissipation sheets 70 to raise a heat dissipation effect.

The heat generated in the driver IC 40 conducts to the heat dissipation sheet 70 disposed under the terminal area of the TFT substrate 100. The heat dissipation sheet 70 is adhered to the casing 4000; therefore, the heat is dissipated to the casing 4000. The heat dissipation sheet 70 flexibly contacts the TFT substrate 100 and the casing 4000, thus, high heat dissipation effect is attained.

The structures of embodiments 1 through 3 can be combined with the structure of embodiment 4. In this case, the heat dissipation sheet 70 is preferably used between the metal plate 60 and the casing 4000 to raise a heat conductance efficiency between them, and thus, to raise a heat dissipation effect. As described above, the heat generated in the LED 10 and the driver IC 40 can be dissipated efficiently through the metal plate 60, thus, a transparent display device of high reliability can be realized by the present invention.

What is claimed is:

1. A liquid crystal display device comprising:
a TFT substrate including a pixel electrode, and
liquid crystal sandwiched between the TFT substrate and a counter substrate
wherein a display area is formed in an area where the TFT substrate and the counter substrate overlap,
a terminal area is formed in an area where the TFT substrate and the counter substrate do not overlap,
an LED is disposed in the terminal area opposing to a side surface of the counter substrate,
the LED is connected to a printed wiring substrate,
a driver IC to drive the liquid crystal display device is disposed in the terminal area,
a metal plate is disposed between the driver IC and the printed wiring substrate, and
the metal plate contacts the printed wiring substrate via a first heat dissipation sheet, and contacts the driver IC via a second heat dissipation sheet.

2. The liquid crystal display device according to claim 1, wherein a lens is disposed between a side surface of the counter substrate and the LED.

3. The liquid crystal display device according to claim 1, wherein a first cover glass is disposed on the counter substrate, and
the LED opposes to a side surface of the first cover glass.

4. The liquid crystal display device according to claim 1, wherein the liquid crystal is a polymer dispersed liquid crystal, in which fine particles including liquid crystal molecules are dispersed in a polymer, and
a common electrode is formed on the counter substrate.

5. The liquid crystal display device according to claim 1, wherein a second cover glass is adhered to the TFT substrate.

6. A liquid crystal display device comprising:
a TFT substrate including a pixel electrode, and
liquid crystal sandwiched between the TFT substrate and a counter substrate
wherein a display area is formed in an area where the TFT substrate and the counter substrate overlap,
a terminal area is formed in an area where the TFT substrate and the counter substrate do not overlap,
an LED is disposed in the terminal area opposing to a side surface of the counter substrate,
the LED is connected to a printed wiring substrate,
a driver IC to drive the liquid crystal display device is disposed in the terminal area,
a first heat dissipation sheet is disposed on the printed wiring substrate at an opposite side to which the LED is connected,
a metal plate is disposed between the driver IC and the printed wiring substrate, and
the metal plate contacts the driver IC via a second heat dissipation sheet.

7. A liquid crystal display device comprising:
a TFT substrate including a pixel electrode, and
liquid crystal sandwiched between the TFT substrate and a counter substrate
wherein a display area is formed in an area where the TFT substrate and the counter substrate overlap,
a terminal area is formed in an area where the TFT substrate and the counter substrate do not overlap,
an LED is disposed in the terminal area opposing to a side surface of the counter substrate,
the LED is connected to a printed wiring substrate,
a driver IC to drive the liquid crystal display device is disposed in the terminal area,
a first metal plate is disposed between the driver IC and the printed wiring substrate
the first metal plate contacts the printed wiring substrate through a first heat dissipation sheet, and
a second metal plate is disposed via a second heat dissipation sheet under the TFT substrate at an opposite side to which the driver IC is connected.

8. The liquid crystal display device according to claim 6, wherein a lens is disposed between a side surface of the counter substrate and the LED.

9. The liquid crystal display device according to claim 7, wherein a lens is disposed between a side surface of the counter substrate and the LED.

10. The liquid crystal display device according to claim 6, wherein a first cover glass is disposed on the counter substrate, and
the LED opposes to a side surface of the first cover glass.

11. The liquid crystal display device according to claim 7, wherein a first cover glass is disposed on the counter substrate, and
the LED opposes to a side surface of the first cover glass.

12. The liquid crystal display device according to claim 6, wherein the liquid crystal is a polymer dispersed liquid crystal, in which fine particles including liquid crystal molecules are dispersed in a polymer, and
a common electrode is formed on the counter substrate.

13. The liquid crystal display device according to claim 7, wherein the liquid crystal is a polymer dispersed liquid crystal, in which fine particles including liquid crystal molecules are dispersed in a polymer, and
a common electrode is formed on the counter substrate.

14. The liquid crystal display device according to claim 6, wherein a second cover glass is adhered to the TFT substrate.

15. The liquid crystal display device according to claim 7, wherein a second cover glass is adhered to the TFT substrate.

* * * * *